Dec. 25, 1923. 1,478,833

R. J. O'BRIEN

TIRE CASING

Filed Aug. 1, 1922

Inventor.
Raymond J. O'Brien,
By his Attorney.

Patented Dec. 25, 1923.

1,478,833

UNITED STATES PATENT OFFICE.

RAYMOND J. O'BRIEN, OF NEW YORK, N. Y., ASSIGNOR TO MORGAN & WRIGHT, A CORPORATION OF MICHIGAN.

TIRE CASING.

Application filed August 1, 1922. Serial No. 578,864.

*To all whom it may concern:*

Be it known that I, RAYMOND J. O'BRIEN, a citizen of the United States, residing at New York, in the county of New York and State of New York, have invented certain new and useful Improvements in Tire Casings, of which the following is a full, clear, and exact description.

Tire casings, generally described, consist of a plurality of plies of fabric and vulcanized rubber composition in thin strata binding and holding the plies together, but permitting slight relative movement thereof. They sometimes fail in service by a separating or parting of the rubber from the plies. Most frequently this separation is believed to be due to the insufficient adhesion of the rubber to the constituent threads or cords constituting the plies.

Heretofore, and generally, it has been the practice to use vulcanizable rubber composition for the "friction" coat—i. e., the coat applied directly to the fabric—which cures in a softer and more yielding condition than the "skim" coat—i. e., the coat applied to and superimposed upon the "friction" coat. I have discovered that by employing a vulcanizable rubber composition for the friction coat that cures in a stiffer and less yielding condition than that heretofore used for the skim coat, separation may be materially minimized.

Figure 1:
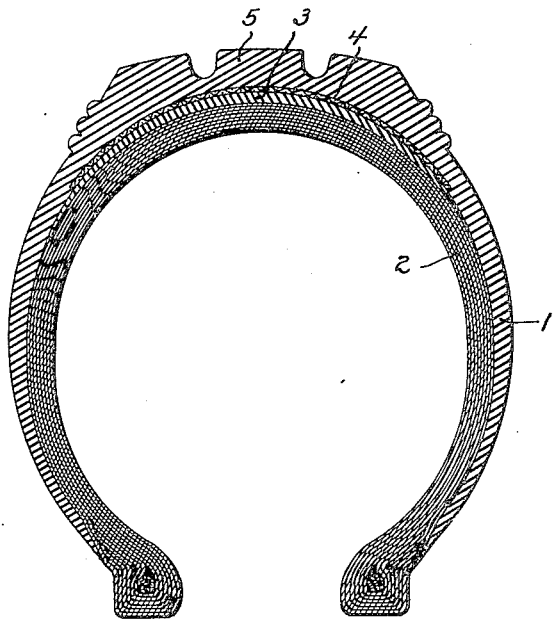
Figure 2:
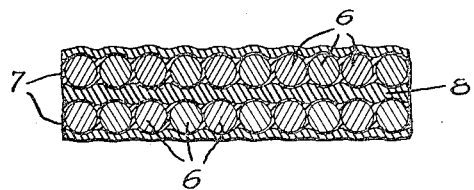

An embodiment of the invention is illustrated in the accompanying drawings, in which Fig. 1 is a conventional cross-section of a tire; and Fig. 2 illustrates on an enlarged scale adjacent plies of fabric with sheathings of stiff vulcanized rubber and an intermediate stratum of softer composition.

Any of the well-known forms of fabric may be employed in the present invention. That is to say, the fabric may be woven, with warp and weft threads of approximately the same size, and equally spaced apart, or it may be woven with close lying warp threads tied together at widely spaced intervals with thin and weak filling threads, or it may consist of close lying parallel threads or cords without any weft or filling threads whatever, in this last case gum being employed to hold the cords in sheet formation. If square woven or cord fabric is employed, it may initially be impregnated with rubber in a finely divided condition, such as is obtained by dissolution in a rubber solvent or as is found in latex, or these two types of fabrics may be employed in a bare or untreated condition. For the impregnation of the woven or cord fabric, or of the parallel threads or cords of fillingless fabric as well as holding them together in sheet formation, I prefer to employ latex rather than rubber that has been cut or rendered semifluid with a rubber solvent for the best results, but it will be understood that either bare or previously impregnated fabric of any of the three types mentioned may be employed, and is comprehended in the present invention.

According to my invention as much of the fabric as is to be superficially treated to prevent or reduce separation, is first coated with vulcanizable rubber composition that cures in a relatively stiff or unyielding condition. Preferably the following compound is used:

|                      | Parts. |
|----------------------|--------|
| Crude rubber         | 100    |
| Magnesium carbonate  | 20     |
| Aniline              | 2      |
| Sulphur              | 10     |

The above formula is merely illustrative of a suitable composition the proportions and ingredients of which may be varied to produce in the vulcanized article a relatively stiff and unyielding stratum. The proportion of the magnesium carbonate to the rubber may be varied from 10 to 75 parts thereof to 100 parts of rubber, but 20 parts of the carbonate to 100 parts of rubber appear to be the optimum. Instead of magnesium carbonate, however, other stiffening agents or a higher content of sulphur may be employed. The unvulcanized compound of the above example is itself too viscous or stiff to be frictioned directly onto the fabric, especially if the latter be of the fillingless type, and reduction of the viscosity is necessary. This may be done by milling before calendering the composition onto the fabric, but preferably the unvulcanized compound is softened with solvent naphtha, gasoline, or other rubber solvent to a dough-like consistency, adapting it to be calendered or spread onto and between the cords of the fabric. Of course, where the nature of the compound permits, the well-known friction calender may be employed to apply the stiffer or less yielding composition to the fabric or cords, and any method or manner of locating the stratum of this composition may be followed.

If a solvent has been employed to reduce the viscosity of the first or "friction" coat, the solvent is then evaporated off preparatory to the application of a second or "skim" coat, which latter, of course, may be applied in any suitable manner, preferably by calendering. Any suitable compound may be employed for this skim coat to produce a stratum of rubber in the finished article which is softer and more yielding than that of the first or "friction" coat.

In the drawings the casing 1 is illustrated in cross section in Fig. 1, the plies of fabric 2, cushion stock 3, breaker strip 4, and tread 5 of which it is composed being shown in a conventional manner therein. It is to be understood, of course, that the vulcanized stiff rubber composition need only be formed where there is liability of separation. Most frequently this occurs between the two outer plies of the carcass, and in Fig. 2 of the drawings I have shown in enlarged cross section the two outlying plies treated to resist separation. But it will be understood that the outermost ply only, or the breaker strip, or any number or all of the plies may have been prepared from fabric that has been coated with stiff vulcanizable rubber composition on one or both of their faces as the construction may require.

In Fig. 2 of the drawings the threads or cords of the fabric are indicated at 6, the stiff vulcanized rubber composition is shown at 7 in the form of sheathings immediately enclosing the threads or cords 6, there appearing between the two plies an intermediate stratum 8 of vulcanized rubber composition which is softer and more yielding than that of the sheathings 7. It is to be understood, of course, that the cords or threads 6, as before mentioned, may be bare or they may have been impregnated with gum entering not only into the cords, but forming a very thin film thereabout. And better results are obtained when the threads or cords forming the plies of fabric are initially impregnated with either solutioned rubber or latex, the latter the best.

Pneumatic tire casings for motor vehicles when constructed according to my invention with sheathings of a relatively stiff and unyielding vulcanized rubber composition between the cords of one layer and a stratum of a softer and elastic vulcanized rubber composition, such as indicated at 8, have been found on test to stand up a much greater time before separating than those casings heretofore made in which, generally, it has been the practice to employ a less stiff and more yielding composition for the "friction" coat than for the "skim" coat. The improved result is believed to be consequent upon a relative unyielding clinch of the stiffer composition 7 to the cords 6. The stresses produced by a localized displacement of one ply relative those contiguous thereto are believed also to be better or more widely distributed. Also the stiffness of the composition 7 gives it a rigid physical character more nearly equal to that of the cords 6 than the composition of the strain-permitting or lubricating stratum 8. It is to be remembered in this connection that the plies of fabric are separated or spaced from one another very small distances, the thickness of the friction and skim coats being gauged in the factories down to a few thousandths of an inch, and consequently the composition of the rubber stock between the plies or between the outer ply and the cushioning strip 3 is a very exacting matter in the production of a satisfactory tire. The play or localized movement between the plies must be permitted without excessively stressing the elastic stratum 8 and without breaking the bond between this play-permitting stratum 8 and the cords 6. By having intermediately a stratum such as is afforded by the sheathings 7, the present invention provides a stepping down or graduation of the elongation of the composition between plies or layers of the cords as well as a tenacious clinch or cling to the cords both of which apparently reduce "separation" or parting materially more than prior practices.

In view of the variations that may be made in the compositions, and in the method of their application to the layers of cord, and in the number of cord lamella that may be treated with the stiff composition, reference is made to the accompanying claims for an understanding of the scope of the invention, which comprehends the use of any friction stock containing material or compounds vulcanizable, with or without heat treatment, to form a stratum that is stiffer, or harder, or less yielding, than the friction stocks heretofore used. In the claims the term "fabric" is intended to comprehend a layer of cords woven or arranged parallel with or without a filling thread.

Having thus described my invention, what I claim and desire to protect by Letters Patent is:

1. A pneumatic tire casing consisting of plies of fabric and vulcanized rubber composition, between the fabric of at least one of which plies and a stratum of the composition is vulcanized rubber composition of a stiffer and less yielding character.

2. A pneumatic tire casing for motor vehicles having plies of reinforcing cords, relatively stiff vulcanized rubber composition sheathing the cords in the plies, and a stratum of softer vulcanized rubber composition intermediate the relatively stiff rubber sheathings of two adjacent plies.

3. A pneumatic tire casing for motor vehicles having layers of reinforcing cords, at least two of which layers are imbedded in and bound together by vulcanized rubber composition of greater stiffness adjacent the cords than midway between the two layers.

4. A pneumatic tire casing for motor vehicles having cords in a plurality of layers held and bound together in cooperative spaced relation by vulcanized rubber composition of greatest stiffness and least yielding adjacent the cords in a layer.

5. A pneumatic tire casing for motor vehicles consisting of reinforcing fibrous threads or cords in layers and of vulcanized rubber composition, the vulcanized rubber composition being of greatest stiffness adjacent the threads or cords and between a pair of outlying layers.

6. A pneumatic tire casing for motor vehicles consisting of reinforcing fibrous elements and vulcanized rubber composition, each fibrous element in a plurality of the layers being impregnated with rubber and sheathed with a relatively stiff vulcanized rubber composition, and a stratum of more yielding vulcanized rubber composition between the stiff composition sheathings of adjacent layers.

7. A pneumatic tire casing consisting of plies of fabric and soft yielding vulcanized rubber composition between the fabric of at least one of which plies and a stratum of the soft and yielding vulcanized rubber composition is vulcanized rubber composition containing a percentage of magnesium carbonate rendering the same relatively stiff and substantially less stretchable than the soft vulcanized rubber composition.

Signed at New York, in the county of New York, and State of New York, this 27th day of July, 1922.

RAYMOND J. O'BRIEN.